United States Patent
Brown, Jr. et al.

(10) Patent No.: US 11,192,784 B2
(45) Date of Patent: Dec. 7, 2021

(54) METHODS AND SYSTEMS FOR MAKING METAL HYDRIDE SLURRIES

(71) Applicant: Safe Hydrogen, LLC, Lexington, MA (US)

(72) Inventors: Kenneth S. Brown, Jr., Marlborough, MA (US); David D. G. Bowen, Berkley, MA (US); Andrew W. McClaine, Lexington, MA (US)

(73) Assignee: Safe Hydrogen, LLC, Lexington, MA (US)

(*) Notice: Subject to any disclaimer, the term of this patent is extended or adjusted under 35 U.S.C. 154(b) by 0 days.

(21) Appl. No.: 16/795,121

(22) Filed: Feb. 19, 2020

(65) Prior Publication Data

US 2020/0180951 A1 Jun. 11, 2020

Related U.S. Application Data

(63) Continuation of application No. 16/133,427, filed on Sep. 17, 2018, now Pat. No. 10,570,012, which is a continuation of application No. 14/983,056, filed on Dec. 29, 2015, now Pat. No. 10,077,190, which is a continuation of application No. 13/782,747, filed on Mar. 1, 2013, now Pat. No. 9,233,847, which is a continuation-in-part of application No. 12/820,737, filed on Jun. 22, 2010, now Pat. No. 8,715,583, which (Continued)

(51) Int. Cl.
 *C01B 3/00* (2006.01)

(52) U.S. Cl.
 CPC .......... *C01B 3/0073* (2013.01); *C01B 3/0005* (2013.01); *C01B 3/0026* (2013.01); *C01B 3/0031* (2013.01); *C01B 3/0094* (2013.01); *Y02E 60/32* (2013.01)

(58) Field of Classification Search
 CPC ... C01B 3/0005; C01B 3/0073; C01B 3/0026; C01B 3/0031; C01B 3/0094; Y02E 60/32
 See application file for complete search history.

(56) References Cited

U.S. PATENT DOCUMENTS

| 2,423,490 A | 7/1947 | Erhardt |
| 2,522,592 A | 9/1950 | Alexander |
| 4,075,312 A | 2/1978 | Tanaka et al. |

(Continued)

FOREIGN PATENT DOCUMENTS

| CN | 101448979 | 6/2009 |
| CN | 102730639 | 10/2012 |

(Continued)

OTHER PUBLICATIONS

European Search Report for Application No. 07758658.4, dated Nov. 27, 2012, 7 pages.

(Continued)

*Primary Examiner* — Anthony J Zimmer
*Assistant Examiner* — Syed T Iqbal
(74) *Attorney, Agent, or Firm* — Fish & Richardson P.C.

(57) ABSTRACT

A method for making a metal-hydride slurry includes adding metal to a liquid carrier to create a metal slurry and hydriding the metal in the metal slurry to create a metal-hydride slurry. In some embodiments, a metal hydride is added to the liquid carrier of the metal slurry prior to hydriding the metal. The metal can be magnesium and the metal hydride can be magnesium hydride.

17 Claims, 2 Drawing Sheets

Related U.S. Application Data is a continuation of application No. 11/392,149, filed on Mar. 29, 2006, now Pat. No. 7,790,013.

(56) References Cited

U.S. PATENT DOCUMENTS

| | | | |
|---|---|---|---|
| 4,142,300 | A | 3/1979 | Gruen et al. |
| 4,200,623 | A | 4/1980 | Muller et al. |
| 4,555,395 | A | 11/1985 | Sirovich et al. |
| 4,740,570 | A | 4/1988 | Klabunde et al. |
| 4,769,225 | A * | 9/1988 | Reilly .................. C01B 3/0031 420/900 |
| 5,093,101 | A | 3/1992 | Knott et al. |
| 5,162,108 | A | 11/1992 | Bogdanovic |
| 5,198,207 | A | 3/1993 | Knott et al. |
| 6,174,345 | B1 | 1/2001 | Chen |
| 6,368,492 | B1 | 4/2002 | Narayanan et al. |
| 6,572,836 | B1 | 6/2003 | Schulz et al. |
| 6,745,801 | B1 | 6/2004 | Cohen et al. |
| 7,052,671 | B2 | 5/2006 | McClaine |
| 7,594,939 | B2 | 9/2009 | Goldstein et al. |
| 7,790,013 | B2 | 9/2010 | McClaine et al. |
| 8,715,583 | B2 | 5/2014 | McClaine et al. |
| 9,233,847 | B2 | 1/2016 | Brown, Jr. et al. |
| 9,580,308 | B2 | 2/2017 | McClaine et al. |
| 10,077,190 | B2 | 9/2018 | Brown, Jr. et al. |
| 2002/0100682 | A1 | 8/2002 | Kelley et al. |
| 2002/0166286 | A1 | 11/2002 | McClaine et al. |
| 2004/0016769 | A1 | 1/2004 | Redmond |
| 2005/0079129 | A1 | 4/2005 | Venkatesan et al. |
| 2005/0175868 | A1 | 8/2005 | McClaine et al. |
| 2007/0196702 | A1 | 8/2007 | Sridhar et al. |
| 2007/0227899 | A1* | 10/2007 | McClaine .................. B01J 8/20 205/637 |
| 2011/0280797 | A1 | 11/2011 | Mohtadi et al. |
| 2012/0174984 | A1 | 7/2012 | Brooks et al. |
| 2014/0205535 | A1 | 7/2014 | McClaine et al. |
| 2016/0130141 | A1 | 5/2016 | Brown, Jr. et al. |
| 2017/0267522 | A1 | 9/2017 | McClaine et al. |
| 2019/0119106 | A1 | 4/2019 | Brown, Jr. et al. |
| 2020/0165126 | A1 | 5/2020 | McClaine et al. |

FOREIGN PATENT DOCUMENTS

| | | |
|---|---|---|
| DE | 102008059395 | 6/2010 |
| EP | 0 094 136 | 11/1987 |
| EP | 1 462 413 | 9/2004 |

OTHER PUBLICATIONS

European Search Report for Application No. 14756259.9, dated Oct. 7, 2016, 5 pages.

International Preliminary Report on Patentability for PCT/US2007/064129, dated Oct. 23, 2008, 6 pages.

International Search Report and Written Opinion for PCT/US2007/064129, dated Sep. 18, 2008, 11 pages.

International Search Report and Written Opinion for PCT/US2014/019418, dated Dec. 9, 2014, 7 pages.

Krishnan et al., "Magnesium-hydride slurry technology for hydrogen storage," Materials Research Society Symposium Proceedings—Materials for Hydrogen Storage—2004 Symposium 2005 Materials Research Society US, vol. 837, Dec. 1, 2004, pp. 143-149.

McClaine et al., "Hydrogen transmission/storage with metal hydride-organic slurry and advanced chemical hydrides/hydrogen for PEMFC vehicles," Proceedings of the 2000 U.S. DOE Hydrogen Program Review, May 9, 2000, pp. 1-14.

McClaine et al., "Chemical hydride slurry for hydrogen storage," Fuel Cells and the Hydrogen Infrastructure—2003 Conference Proceedings, Chapter 2, 2-A, 36-44, 2003.

Provisional application, Sridhar et al., U.S. Appl. No. 60/782,268, filed Mar. 15, 2006, 31 pages.

Sinha and Lasher, "Metal Hydride Slurry Hydrogen Delivery System," Poster #256, TIAX LLC, Fuel Cell Seminar, San Antonio, TX, Nov. 4, 2004, 13 pages.

Weinmann, "Hydrogen—the flexible storage for electrical energy," Power Engineering Journal, 13(3):164-170, 1999.

* cited by examiner

METHODS AND SYSTEMS FOR MAKING METAL HYDRIDE SLURRIES

CROSS-REFERENCE TO RELATED APPLICATIONS

This application is a continuation of and claims priority to U.S. application Ser. No. 16/133,427, filed Sep. 17, 2018 (now U.S. Pat. No. 10,570,012 issued Feb. 25, 2020), which is a continuation of and claims priority to U.S. application Ser. No. 14/983,056, filed Dec. 29, 2015 (now U.S. Pat. No. 10,077,190 issued Sep. 18, 2018), which is a continuation of and claims priority to U.S. application Ser. No. 13/782,747 filed on Mar. 1, 2013 (now U.S. Pat. No. 9,233,847 issued Jan. 12, 2016), which is a continuation-in-part of and claims priority to U.S. application Ser. No. 12/820,737, filed Jun. 22, 2010 (now U.S. Pat. No. 8,715,583 issued May 6, 2014), which is a divisional of and claims priority to U.S. application Ser. No. 11/392,149, filed Mar. 29, 2006 (now U.S. Pat. No. 7,790,013 issued Sep. 7, 2010). The disclosures of the prior applications are incorporated by reference in their entirety.

TECHNICAL FIELD

This document relates to systems and techniques for making metal-hydride slurries, particularly magnesium hydride slurries.

BACKGROUND

Energy in the form of electricity can be stored in the form of hydrogen, for example, by applying the electricity to an electrolysis process to disassociate the hydrogen from oxygen in water. Energy in the form of heat can also be stored in the form of hydrogen by using a thermal conversion process to dissociate the hydrogen from oxygen in water.

Hydrogen can be incorporated into a metal hydride. Later, the hydrogen can be released by mixing water with the metal hydride and used to provide energy, for example, to a car. Magnesium and hydrogen can be converted into magnesium hydride using temperatures of 500° C. or higher and pressures of 200 atmospheres or higher. Catalysts can reduce the required temperatures and pressures.

SUMMARY

This document describes systems and techniques that may be used to produce slurries of metal hydrides. For example, methods of producing magnesium hydride slurries are disclosed.

In general, a method of producing a metal-hydride slurry includes combining a metal with a liquid carrier to form a metal slurry and hydriding the metal while it is in the slurry. Hydriding the metal in the presence of the liquid carrier is safer than hydriding a metal without the presence of the liquid carrier of the slurry. When metal particles are mixed with liquid carrier, the metal particles can be protected from moisture or oxygen in the air. This can reduce the hazards associated with magnesium powder handling. Some metal hydride formers are very reactive, thus the presence of the liquid carrier can make the handling of such metal particles safer. Metal particles can further be made or reduced in size in the presence of the liquid carrier.

Hydriding the metal while in the slurry can also be cheaper. By hydriding the metal in the presence of the surrounding liquid carrier, the slurry can be stirred to improve the heat transfer rates from heated metal particles to the surrounding liquid carrier, which can make the process more efficient and thus cheaper. The use of pumps to transport the slurry can also reduce costs due to the elimination of more expensive techniques for safely handling magnesium powder.

Additionally, in some cases, metal hydride can be added to the slurry before hydriding the metal to help catalyze the reaction of the metal to a metal hydride.

The details of one or more embodiments are set forth in the accompanying drawings and the description below. Other features and advantages will be apparent from the description and drawings, and from the claims.

DETAILED DESCRIPTION

Generally, systems and methods are provided for forming metal hydride slurries and for storing energy in the metal hydride slurries. The metal hydride slurries described herein can include a hydrided metal or a hydrided metal alloy. The metal or metal alloy can be dehydrided and rehydrided in a reversible fashion, depending on the conditions (e.g., heat and/or pressure) to which the slurries are subject.

Methods for making metal-hydride slurries provided herein can include adding metal to a liquid carrier to create a metal slurry and hydriding the metal in the metal slurry to create a metal-hydride slurry. Hydriding the metal in the presence of the liquid carrier can be safer than hydriding a metal without the presence of the liquid carrier of the slurry. When metal particles are mixed with the liquid carrier (e.g., mineral oil), the metal or metal alloy can be protected from moisture or oxygen in the air. Some metal hydride forming metals are very reactive with oxygen or water, thus the presence of the liquid carrier that can protect the particles from oxygen or water can make the handling of the metals (e.g., metal particles) safer. Metal particles can further be made or reduced in size in the presence of the liquid carrier.

Hydriding the metal while in the slurry can also be cheaper. By hydriding the metal in the presence of the surrounding liquid carrier, the slurry can be stirred to improve the heat transfer rates from heated metal particles to the surrounding liquid carrier, which can make the process more efficient and thus cheaper. The process will be able to use pumps rather than powder handing technologies to move the powdered metal and agitation can be supplied with the movement of the slurry in the hydrider. Pumps are generally cheaper than powder handling processes. The primary reason for lower costs when using a slurry approach are the reduced risks associated with the handling of slurry rather than handling powder that must be protected from air and water. Additionally, in some cases, metal hydride can be added to the slurry before hydriding the metal to help catalyze the reaction of the metal to a metal hydride.

Figure 1:
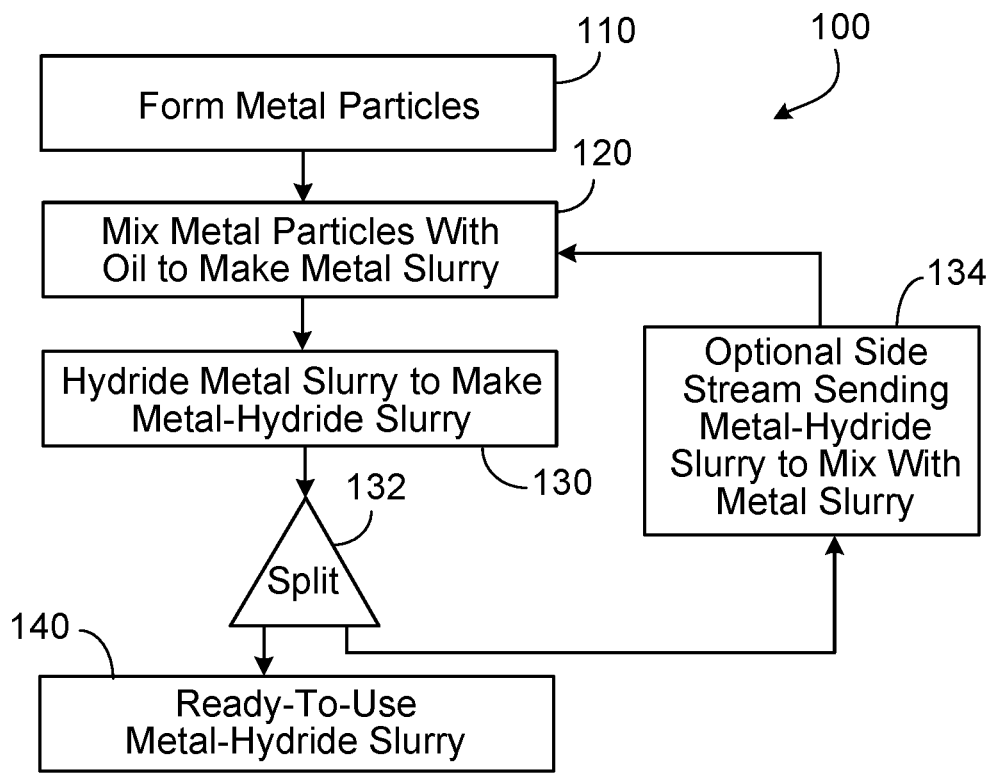
FIG. 1 is a flow chart showing an exemplary process for making magnesium hydride slurry.

FIG. 1 depicts an exemplary process 100 for making a metal-hydride slurry provided herein. A metal or metal alloy can be used as the hydride former in a method provided herein. The metal or metal alloy can be in the form of particles. FIG. 1 depicts a step 110 of forming metal particles and a step 120 of mixing the metal particles with liquid carrier to make a metal slurry. The particles can be formed before, during, or after being placed in the liquid carrier. For example, the metal or metal alloy can be formed into particles in the presence of liquid carrier by crushing the metal/liquid carrier mixture. In some cases, the reversible hydride former powder is first combined with a mixture of the mineral oil (and optionally a dispersant), which is then ground (e.g., in a grinder or mill) to further reduce the size of the particles. In some cases, the final particles are primarily from about 1 microns to about 200 microns (e.g., from about 1 microns to about 100 microns or from about 1 micron to about 50 microns) in size across their smallest dimension. In some cases, a metal or metal alloy can be cast into particles, crushed into particles, machined into particles, or crushed into particles prior to being introduced into the liquid carrier.

In some cases, a metal or a metal alloy is melted and sprayed into a liquid carrier to create particles of metal or metal alloy that are cooled by the liquid carrier. In this process, the metal is melted and then pumped through a nozzle to form a spray of particles. In some cases, a gas is introduced in the sprayer to help with the atomization. The liquid atomized droplets of the metal can be sprayed into a vessel to protect the droplets from contact with air or moisture. In the vessel, jets of gas and/or oil can be sprayed across the atomized jet to cool the particles. The particles can then be captured by the oil and removed from the cooling chamber. The spraying and cooling processes can be performed in a hydrogen atmosphere or in an inert gas atmosphere.

The particles can have any suitable dimensions. In some cases, the particles have an average diameter of between 0.1 micron and 200 microns (e.g., between 0.5 microns and 50 microns, between 0.75 microns and 30 microns, between 0.1 and 1 microns, between 1 and 10 microns, between 10 microns and 20 microns, between 20 microns and 30 microns, between 30 microns and 40 microns, between 40 microns and 50 microns, between 50 microns and 60 microns, between 60 microns and 70 microns, between 70 microns and 80 microns, between 80 microns and 90 microns, between 90 microns and 100 microns, between 100 and 150 microns, or between 150 microns and 200 microns). In some cases, the particles have an average diameter of less than 5 microns.

FIG. 1 further depicts a step 130 of converting the metal particles into a metal hydride. The reaction, in a simple form, involves bringing gaseous hydrogen in contact with the metal or metal alloy. This reaction can be represented as follows:

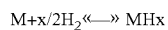

$$M + x/2 H_2 \longleftrightarrow MH_x$$

where M is the metal or metal alloy and X is the number of hydrogen atoms in the final metal hydride product. This reaction is sometimes described as an adsorption process rather than a bonding process.

The metal slurry can be converted into a metal-hydride slurry in a charging device. A charging device can include a slurry-holding vessel and a heating device (e.g., heating coils, a heat exchanger, a heating plug, and/or a counter flow heat exchanger) for heating the metal slurry therein to the charging temperature. The charging device also includes a hydrogen gas inlet and optionally a pressure regulator for maintaining the charging pressure within the vessel. As the charging reaction is exothermic, the charging device may include a heat removal apparatus (e.g., a heat pump or a heat exchanger) for maintaining the slurry being charged within a desired temperature range. The charging device can also include stirring or mixing components to create a more uniform temperature distribution throughout the slurry and to assist in the distribution of hydrogen throughout the slurry. The charging device can be supplied with freshly created metal slurry.

In some examples, the charging device operates on a batch-by-batch basis. Metal slurry is pumped into the device, which is heated and supplied with hydrogen gas until the metal slurry is converted into a metal-hydride slurry. The pressure is vented, the slurry is cooled, and the metal-hydride slurry is pumped from the device (e.g., to a storage tank). The process is then repeated. In some cases, the charging device operates continuously as slurry is continuously pumped, heated, charged, cooled and removed.

Figure 2:
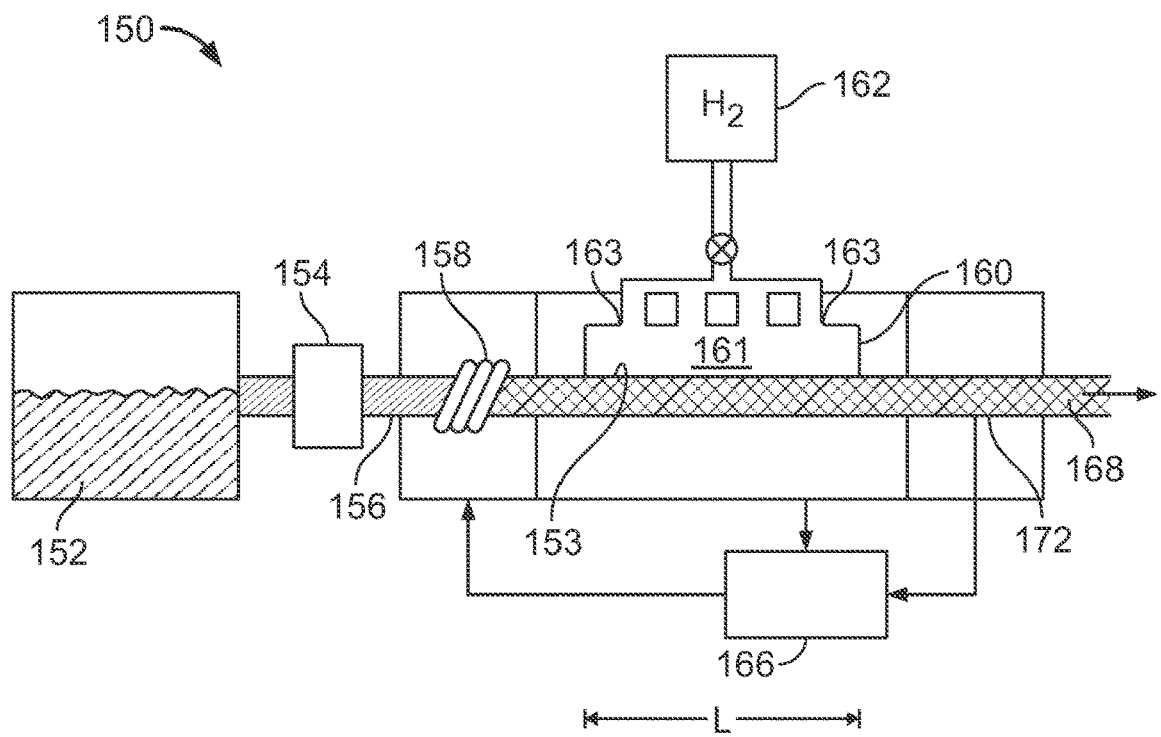
FIG. 2 is a schematic diagram of a metal hydride charging device.

As shown in FIG. 2, in a continuous-mode charging apparatus 150, metal slurry 152 is fed by a pump 154 into a first section of tubing 156, where it is heated to the charging temperature by heating coils 158. Once heated, the metal slurry 152 is pumped into a pressure chamber 160 having a headspace 161 located above the metal slurry 152. Hydrogen gas 162 is introduced via gas inlets 163 into the headspace 161, where it is in direct contact with a surface 153 of the metal slurry 152. The hydrogen gas 162 is introduced under pressure sufficient, given the temperature selected, to initiate the hydride reaction. Alternatively, the hydrogen gas is introduced at the bottom of the slurry pool using sparging tubes to produce many very small bubbles of hydrogen. The hydrogen rising through the slurry increases the surface area of the slurry and promotes the rate of absorption by the metal hydride. The pressure chamber 160 is of a length sufficient, when combined with the flow rate of the slurry, to result in a lag time of the slurry in the pressure chamber 160 sufficient for substantially complete charging of the slurry. As the metal in the metal slurry 152 is hydrided to form a charged metal-hydride slurry 168, heat is given off by the slurry. An optional heat exchanger 166 collects and transfers heat from the slurry to the first section of tubing 156, where it assists in the heating of metal slurry 152. Once the slurry is fully charged, it exits the pressure chamber 160 and enters a third section of tubing 172, in which it is cooled to about room temperature, e.g., by the heat exchanger 166. The charged metal-hydride slurry is then pumped out of the charging device 150.

In a variation of this arrangement, the process could be started by pumping some discharged metal-hydride slurry through a counter flow heat exchanger and then through a heater (that would raise the temperature of the discharged metal-hydride slurry to operating temperature) and then into the charging volume where hydrogen will contact the slurry. A reaction between the metal or metal alloy and the hydrogen will produce heat, some of which must be removed actively to maintain the slurry temperature at the desired reaction temperature. After being in the hydriding section for a couple hours, the hydriding should be complete and the charged metal-hydride slurry will pass back through the counter flow heat exchanger and into a separate container for the charged metal-hydride slurry. The hot slurry passing through one side of the counter flow heat exchanger will lose its heat to the cold depleted slurry passing through the other side of the counter flow heat exchanger.

In some cases, the metal slurry can include some metal hydrides prior to being hydrided. The amount of metal hydride added to the metal slurry, in some embodiments, is from about 1% to about 50% (e.g., from about 3% to about 20%). For magnesium hydride, the hydride can function as a catalyst, increasing the rate of hydride formation by the reversible hydride former, for example, as described in U.S. Pat. No. 5,198,207, which is hereby incorporated herein by reference. As used herein, the term "metal slurry" is a slurry including virgin metal and optionally metal hydride. Once the metal slurry is hydrided, it becomes a "metal-hydride slurry." The presence of some amount of metal hydrides in the metal slurry prior to hydriding the metal slurry to form the metal-hydride slurry can help catalyze the conversion of the metal or the metal alloy into a metal hydride in the slurry. In some cases, the metal or metal alloy can be added to a liquid carrier that is in the form of a mixture of a liquid carrier and a metal hydride (e.g., magnesium hydride). In some cases, the liquid carrier can include at least 1.0 weight percent metal hydride prior to adding the metal or metal alloy. In some cases, a small amount of metal hydride or a mixture containing metal hydride is added to the liquid carrier before or after adding the metal or metal alloy to the liquid carrier to create a metal slurry including at least 1.0 weight percent metal hydride.

FIG. 1 depicts a recirculation in the process in order to include metal hydrides in the metal slurry. FIG. 1 depicts a process of splitting 132 the resulting metal-hydride slurry and sending a side stream 134 of metal-hydride slurry to be mixed with the metal and/or metal alloy and the liquid carrier to form the metal slurry. The split 132 can be conducted so that the metal slurry created in step 120 includes at least 1.0 weight percent metal hydride (e.g., at least 1.2 weight percent metal hydride, at least 3 weight percent metal hydride, or at least 5 weight percent metal hydride) prior to hydriding the metal slurry. The other stream 140 can then be used as a metal-hydride slurry in one or more commercial operations.

In some cases, a metal slurry including metal hydrides can be created using multiple steps. For example, a metal or metal alloy can be added to a liquid carrier to form a first metal slurry. The first metal slurry can then be mixed with a metal-hydride slurry to form a second metal slurry that includes at least 1.2 weight percent metal hydride. The second metal slurry can then be hydrided to form a metal-hydride slurry. A portion of that metal-hydride slurry can then be mixed with another stream or batch of metal slurry to again form a metal slurry that includes at least 1.0 weight percent metal hydride. For example, a first metal slurry (e.g., a slurry consisting essentially of liquid carrier (and optionally dispersants) and particles of virgin metal and/or virgin metal alloy) can be mixed with a metal-hydride slurry in a ratio of at least 2:1 to form a second metal slurry.

Once the metal slurry is hydrided, the resulting metal-hydride slurry is "charged" or "partially charged." Subsequent use of the metal-hydride slurry, however, may release hydrogen and thus "deplete" or "partially deplete" the metal-hydride slurry. Metal-hydride slurries can generally be described as "charged" when a substantial amount (e.g., 80% or more) of the hydridable component is hydrided; "depleted" when a substantial amount (e.g., 80% or more) of the hydridable component is not hydrided; or "partially charged"/"partially depleted" when the slurry contains both hydrided and non-hydrided metal, with the hydrided metal being generally present in an amount between about 20% and 80% of the total amount of hydridable metal. In some cases, at least 70% of the metal in the metal slurry is hydrided when the metal slurry is hydrided to become the metal-hydride slurry. In some cases, between 85% and 95% of the hydridable metal in the metal slurry will be hydrided during the hydriding of the metal slurry. In general, "charged" metal-hydride slurries can include some level of hydridable component that is not hydrided, and a "depleted" metal-hydride slurry can include some level of hydridable component that is hydrided.

The metal-hydride slurry provided herein can store energy from any available source. In some cases, the metal-hydride slurry can be used to transport energy safely and efficiently. For example, energy available at a first location (e.g., a windmill farm in Kansas) can be stored in a metal-hydride slurry provided herein and transported to a second location (e.g., New York) where the energy can be used (e.g., in cars that are able to burn hydrogen as a fuel). At a first location, wind can cause rotors of windmills to spin, driving generators to produce electricity. The electricity can be carried on cables to electrical terminals of an electrolyzer. The system can also include a charging device. Using the electricity, the electrolyzer can separate water into hydrogen gas and oxygen gas. The water can be provided from a source through a pipe. The hydrogen gas can be passed through a hydrogen gas outlet and a pipe into the charging device. The oxygen gas can be vented from the electrolyzer through an oxygen gas outlet, where it can be collected for further use or vented to the atmosphere. In some cases, the electrolyzer can pump the hydrogen gas into the charging device under pressure (e.g., at least about 50 psia [pounds per square inch absolute]) and the contents of the charging device can be maintained under pressure. The pressure can be in a range of about 100 psia or more, 150 psia or more, 200 psia or more, 250 psia or more, 500 psia or more, 1000 psia or more, or 1500 psia or more. The pressure level can be set based on the ability of the charging device to withstand pressure and handle the heat generated by the reaction. The reaction between the metal and the hydrogen can produce heat and charged metal hydride. The reaction rate of the metal with hydrogen can be faster with higher pressure. In some cases, the slurry can be stirred to aid in heat transfer. In some cases, the walls of the charging device and/or the surfaces of a stirrer can be coated with a catalyst that catalyzes the formation of metal hydrides. In some cases, the hydrogen gas can be collected in a hydrogen gas tank where it is pressurized before being delivered to a charging device. Additional details about how hydrogen gas can be created, how a metal-hydride slurry can be hydrided, and how the slurry can be transported can be found in columns 4 and 5 and FIG. 1 of U.S. Pat. No. 7,790,013, which is hereby incorporated by reference in its entirety.

In some cases, a pressurized charging device can receive a stream of metal slurry provided herein and/or depleted metal-hydride slurry. A depleted metal-hydride slurry can be a slurry that has been at least partially dehydrided. The proportion of metal hydride to elemental metal in the metal slurry or depleted metal-hydride slurry can be 1.0% or more by weight.

The liquid carrier can be a liquid that does not chemically react either with $H_2$ or with the metal hydride and/or metal or metal alloy at the temperatures and pressure in which it will be used, and that will not deactivate the surface of the hydride or metal or metal alloy in relation to its catalytic capability to dissociate the $H_2$ molecule into atoms or to prevent recombination of the atoms into the $H_2$ molecule. The liquid carrier can have the capacity to dissolve measurable amounts of hydrogen. The carrier liquid, in some cases, is an organic carrier liquid, such as mineral oil or a low molecular weight hydrocarbon, for example, an alkane (e.g., pentane or hexane). In some case, the liquid carrier is a light mineral oil. Other carrier liquids could include fluorinated hydrocarbons, such as perfluorodecane, silicone based solvents, saturated organic liquids, such as undecane, isooctane, octane and cyclohexane, or mixtures of high boiling point hydrocarbons such as kerosene, and mixtures of them.

In some cases, the inert carrier liquid can be a non-toxic light mineral oil that exhibits a high flash point, in the range of about 154° C. to about 177° C. and a viscosity in the range of about 42 Saybolt Universal seconds (S.U.s.) to about 59 S.U.s. The mineral oil is not chemically reactive with metal hydrides, produces relatively low vapor pressure, and remains liquid through a temperature range of about −40° C. to 200° C. The carrier liquid renders the metal-hydride slurry pumpable and, as a safe liquid, simple to store or transport. The carrier can act as a barrier between the hydride and atmospheric water, reducing the reaction of the two to form a hydroxide, which can reduce the ability of the slurry to store and release hydrogen. The use of a slurry permits easy refueling, as by topping off a tank. Other carriers may work well, including carriers that are without water bonds and preferably are without OH bonds. Silicone-based carriers may also work for slurries.

In addition to the metal and/or the metal alloy, the metal hydride, and the liquid carrier, other components can be included in the metal slurries provided herein. For example, a dispersant can be included for stabilizing the slurry. In some cases, the metal slurry and resulting metal-hydride slurry can include a dispersant. The dispersant can be, for example, a triglyceride dispersant, which sterically stabilizes the slurry. The triglyceride dispersant can be, for example, triglyceride of oleic acid, or triolein. Other dispersants that could be used include polymeric dispersants, e.g., Hypermer™ LP1. The dispersant can be polymeric dispersant. A combination of triglyceride and polymeric dispersant can also be used and may be particularly useful if the hydride is magnesium hydride. Other dispersants include oleic acid, polyacrylic acid, and hexadecyltrimethylammonium bromide (CTAB). The dispersant can in some cases be present at concentrations in the metal slurry and/or the resulting metal-hydride slurry of at least about 0.05% (e.g., at least about 0.1%, at least about 0.5%, at least about 0.75%, at least about 1.0%, at least about 1.5%, at least about 2.0%, at least about 2.5%, at least about 3.0%, or at least about 3.5%) and/or at most about 4.0% (e.g., at most about 3.5%, at most about 3.0%, at most about 2.5%, at most about 2.0%. at most about 1.5%, at most about 1.0%, at most about 0.75%, at most about 0.5%, or at most about 0.1%). For example, a metal slurry can be hydrided to form a metal-hydride slurry including magnesium hydride, light mineral oil, and a mixture of 0.0625% CTAB with 1% poly(acrylic) acid forms a stable metal-hydride slurry. CTAB can make the slurry more flowable and the poly (acrylic) acid helps to keep the magnesium hydride particles in suspension. The dispersant can attach to the particles of hydride, increasing the drag of the particle in the carrier fluid to thus help prevent settling. The dispersant also helps to keep the particles from agglomerating. The dispersant promotes the formation of the slurry and the stabilization of the hydride into the mineral oil. Dispersants can in certain embodiments also have surfactant properties that may also be useful in the formation of the slurry. For example, metal slurries provided herein can include a triglyceride or polyacrylic acid (~1%) or oleic acid (~0.125%) as dispersants. In some cases, the metal slurry can include hydride catalyst. In some cases, the hydride catalyst is another metal (e.g., vanadium, nickel, and/or iron).

The concentration of the metal in the metal slurry and the metal hydride in the charged metal-hydride slurry can be in the range of 40 to 80 weight percent (e.g., 50 to 70 weight percent, or 55-60 weight percent). The use of denser metal hydrides can result in higher metal hydride concentrations than will the use of less dense metal hydrides. Dense metal hydrides are metal hydrides having a density of at least about 1 gm/mL, and include, for example, lanthanum penta-nickel, while less 50 dense metal hydrides have a density of no more than about 1 gm/mL, and include, for example, lithium hydride. Magnesium hydride slurries can have hydride concentrations of at least about 50 weight percent (e.g., at least about 55 weight percent, at least about 60 weight percent, at least about 65 weight percent, at least about 70 weight percent, or at least about 75 weight percent), and/or at most about 80 weight percent (e.g., at most about 75 weight percent, at most about 70 weight percent, at most about 65 weight percent, at most about 60 weight percent, or at most about 55 weight percent). In some case, the metal slurry includes at least 50 weight percent magnesium and one or more elements selected from the group consisting of vanadium, nickel, and iron.

In some cases, the metal and/or metal alloy in the metal slurry can include one or more of magnesium, vanadium, FeTi, $LaNi_5$, $MgNi_2$, NaAl or other metal hydride formers whether an elemental metal, metal alloy or intermetallic material. Intermetallic hydride formers include $LaNi_{45}AlO_5$, $LaNi_5$ and $TiFe_7$ $Mn_2$. Metallic hydride formers include the transition metals (periodic table Groups IIIA to VIIIA), including the lanthanide and actinide series. They have a large capacity for hydrogen storage coupled with ready release of hydrogen at moderate temperatures and pressures and an ability to undergo many cycles of absorption and desorption with little decrease in capacity. Metals and metal alloys known to form reversible hydrides for reversibly capturing hydrogen include titanium alloys as set forth in U.S. Pat. No. 4,075,312, lanthanum alloys as disclosed in U.S. Pat. No. 4,142,300, and other alloys as shown in U.S. Pat. No. 4,200,623. Elemental metals known to form metal hydrides are described in "Metal Hydrides" by W. M. Mueller, J. P. Blackledge and G. G. Libowitz, Academic Press, N.Y. 1968. These patents and references are incorporated here by reference.

The metal slurries provided herein can be drawn by a pump through a pipe from a metal slurry source and forced through a slurry inlet into the charging device. The metal slurry in the pressurized charging device can then be heated using heating coils. When the metal slurry is heated, the metal in the slurry can be further charged with hydrogen gas, whereby the amount of hydrogen in the form of a metal hydride in the slurry is increased to form a metal-hydride slurry.

For magnesium hydride, the reaction rates are very slow until the temperature of the hydride is above about 280° C., so heating the magnesium hydride to this temperature can speed up the initial reaction. The rate then generally quickens, and the temperature and/or pressure can be lowered to control the reaction rate. By this process, the metal slurry becomes a charged metal-hydride slurry. The temperature to which the pressurized slurry is heated for charging can be within a wide range, for example, in the range of from about 50° C. to about 350° C., depending on the metal hydride used in the slurry. For magnesium hydride, the charging range is from about 250° C. to about 400° C. (e.g., from about 260° C. to about 300° C.).

After the charging, the metal-hydride slurry is cooled, e.g., to room temperature. The cooling of the metal-hydride slurry can happen before or after a side stream 134 is separated for recirculation for mixing with another stream or batch of metal slurry. The cooled metal-hydride slurry does not release a significant amount of hydrogen while its temperature remains within a cool range, and is therefore safe to store and/or transport. A "significant amount" of hydrogen is an amount large enough to significantly affect the amount of energy available at the site of hydrogen evolution or the cost-effectiveness of using the slurry as a source of energy, or enough to create storage and/or transportation difficulties, for example, due to increases in pressure resulting from the production of hydrogen. For example, in some cases, the cooled charged metal-hydride slurry releases no more than about 1% of its total hydrogen (e.g., no more than about 10%, no more than about 1%, or no more than about 0.1% of its total hydrogen). In some cases, the amount of hydrogen release can be less than 0.1%. The available range of temperatures at which the charged metal-hydride slurry does not release a significant amount of hydrogen depends on the metal hydride used in the slurry. For magnesium hydride, the slurry will not produce significant amounts of hydrogen at temperatures below about 200° C. (e.g., below about 100° C., below about 80° C., below about 60° C. or below about 40° C.). Other reversible hydrides may be kept cooler in order to ensure that a significant amount of hydrogen is not released. In some cases, the metal-hydride slurry can be cooled in a heat exchanger that heats the metal slurry.

Once the metal-hydride slurry is formed, a pump can pump the metal-hydride slurry from a metal-hydride slurry outlet through a pipe to a metal-hydride slurry storage device, where the charged metal-hydride slurry can be stored indefinitely. The charged metal-hydride slurry storage device can have an outlet to allow the slurry to be withdrawn by a pump into a slurry carrier (e.g., a tanker truck). The slurry carrier could be anything capable of moving a fluid over a distance, such as automotive vehicles, rail cars, ships, barges, and pipes or other conduits. The carrier could be trucks of the kind that are used to transport gasoline or fuel oil. The pump can be part of a service station that is dedicated to serving trucks from a single distributor or can be available to serve trucks of multiple distributors.

The slurry carrier can transport the charged metal-hydride slurry, including the energy stored in the hydride in the form of hydrogen, from a first location (e.g., a location within a first jurisdiction) to a second location (e.g., a location within a second jurisdiction). At the second location, a station for offloading the transported slurry can include a pipe through which a pump can withdraw the slurry from the transporter and pump it to a charged metal-hydride slurry storage tank. When hydrogen is needed, charged metal-hydride slurry can be pumped by pump from the charged metal-hydride slurry storage tank through a pipe to a slurry inlet and into a discharge device.

A discharge device can contain a heater (e.g., a heating coil) for heating the slurry to a temperature at which the metal hydride of the slurry releases hydrogen. In some cases, the discharge device can heat the metal-hydride slurry under anhydrous conditions. The heating temperature is dependent on the discharge characteristics of the metal hydride in the slurry. For magnesium hydride, the heating temperature is from about 250° C. to about 400° C. (e.g., from about 290° C. to about 370° C. or from about 320° C. to about 360° C.). Other hydrides can have different temperatures at which they release hydrogen. Generally, the temperature will be least about 150° C. (e.g., at least about 80° C., at least about 100° C., at least about 125° C., at least about 175° C., at least about 200° C., at least about 225° C., at least about 250° C., at least about 275° C., at least about 300° C., at least about 325° C., at least about 350° C., at least about 375° C., or at least about 390° C.) and/or at most about 40° C. (e.g., at most about 390° C., at most about 375° C., at most about 350° C., at most about 325° C., at most about 300° C., at most about 275° C., at most about 250° C., at most about 225° C., at most about 200° C., or at most about 175° C.). In some cases, the discharge device can include a catalyst on one or more surfaces of the discharge device and/or on a stirrer to catalyze the dehydrating process.

The discharge device can operate at a pressure determined by the discharge characteristics of the metal hydride and the system economics. For magnesium hydride, the highest discharge rates can occur with a pressure near atmospheric pressure or lower. In some cases, the hydrogen can be provided at a pressure ranging from 30 psia to 200 psia. In some case, the hydrogen can be provided at a pressure ranging from 65 psia to 120 psia.

The discharge device can be designed to exclude air and water, specifically oxygen and water. The charging device is also designed to exclude air and water as these materials can react with the metal hydride and prevent it from absorbing or desorbing hydrogen. Accordingly, in some cases, the discharge device can be operated under anhydrous conditions.

As the charged metal-hydride slurry is heated and the hydrogen gas is discharged, the slurry becomes a depleted metal-hydride slurry (a metal-hydride slurry that includes less than a significant amount of hydrogen, for example, because some of the hydrogen has evolved from the slurry or because the slurry has been newly formed and has not been hydrided). The depleted reversible slurry can be withdrawn by a pump through a gas outlet into a slurry carrier (which could be, for example, the same trucks used to carry the charged metal-hydride slurry) for transport back to the first location (or another recharging facility) for recharging. In some cases, a depleted metal-hydride slurry can be mixed with virgin metal and liquid carrier to make a metal slurry.

The hydrogen gas that is discharged from the charged metal-hydride slurry can be vented through a gas outlet and collected, e.g., bottled in a hydrogen bottle, or directly used. Bottled hydrogen could be used, for example, to power fuel cells in a vehicle. In some cases, the hydrogen can be put to a use other than as an energy source. For example, the hydrogen can be used in laboratory work as a carrier gas for a gas chromatograph, as a reactant in a chemical reaction requiring hydrogen, or as a welding gas, e.g., to replace acetylene. In some cases, the metal-hydride slurry can be used as an energy source for a vehicle directly, rather than as a source for bottled hydrogen. For example, the charged metal-hydride slurry can be pumped directly into a vehicle, e.g., into a storage tank in a vehicle. The vehicle can have a discharge device located within the vehicle, allowing for the evolution of hydrogen for use as a fuel source in the vehicle. In some cases, the vehicle could also have a charging device, such that the depleted or partially depleted metal-hydride slurry can be recharged within the vehicle itself.

The charged metal-hydride slurry can be safely stored and transported, and the hydrogen can be easily extracted for use as a fuel. The charged metal-hydride slurry can be combustion resistant and can be safely handled, stored, and transported. The charged metal-hydride slurry can be stable at normal environmental temperatures and pressures, for example, such that hydrogen does not dissociate from the hydride and evolve. The charged metal-hydride slurry can easily be pumped through conduits and into storage tanks, transportation devices, and/or charging and discharging devices.

The reaction direction is determined by the pressure of the hydrogen gas and/or the temperature of the reaction. In some examples in which magnesium metal is used in the metal slurry and converted into magnesium hydride, a temperature of from about 250° C. to about 400° C. (e.g., from about 280° C. to about 350° C. or from about 290° C. to about 320° C.) is required for the hydriding of the magnesium, while a temperature of from about 280° C. to about 400° C. (e.g., from about 300° C. to about 380° C., or from about 320° C. to about 360° C.) results in dehydriding of the magnesium hydride. Other metal/metal hydride systems can operate with significantly reduced temperatures and pressures, e.g., absorption and desorption temperatures of no more than about 250° C. (e.g., no more than about 225° C., no more than about 200° C., no more than about 175° C., no more than about 150° C., no more than about 125° C., no more than about 100° C., or no more than about 80° C.). In some cases, alloys and/or mixtures of hydrides may improve both the kinetics and the temperature ranges of use. Generally, for the hydriding of the metal, an increase in the hydrogen pressure results in a faster hydriding reaction and/or a lower temperature requirement for hydriding. In some cases, the hydrogen pressure is at least about 15 psia (e.g., at least about 50 psia, at least about 100 psia, at least about 150 psia, at least about 200 psia, or at least about 250 psia) and/or at most about 300 psia (e.g., at most about 250 psia, at most about 200 psia, at most about 150 psia, at most about 100 psia, or at most about 50 psia). The pressure will generally be partially dependent upon the temperature (and vice-versa). For example, while magnesium slurries produce a relatively rapid absorption of hydrogen at 300° C. at a pressure of 150 psia, a lower temperature might provide a faster reaction.

Generally, a fast reaction is desirable to reduce costs. During hydriding, however, heat is produced and must be removed from the system. High rates of heat release could potentially decompose the liquid carrier (e.g., mineral oil) in the slurry. In some cases, a combination of temperature and pressure parameters can be used to control the direction and speed of the reaction, and thus the heat produced. For example, the pressure can be initially relatively low, and can then be increased as the process proceeds.

As the hydride reaction is reversible, a metal-hydride slurry provided herein can function to transport energy in the form of hydrogen repeatedly, being charged and discharged many times (e.g., at least about 5 times, at least about 10 times, at least about 20 times, at least about 25 times, at least about 50 times, at least about 75 times, at least about 100 times, at least about 125 times, at least about 150 times, at least about 250 times, at least about 500 times, at least about 1000 times, or at least about 2000 times). Generally, the greater the number of charge/discharge cycles, the more cost-effective the system.

The metal-hydride slurries can have a liquid-like flow characteristic that can allow for the use of existing liquid fuel infrastructure in the storage and transportation of the slurry. The nature of the carrier liquid, the amount of the dispersant, and the size of the hydride particles all affect the viscosity of the slurry. The oil in the slurry can protect the metal hydride from unintentional contact with moisture in the air. The slurry can serve as a path for the dissipation of heat generated from the exothermic charging reaction. The dispersant maintains the hydride particles in suspension. The dispersant attaches to the particles and fends off adjacent particles to prevent agglomeration of the particles. The slurry burns only if high heat is applied, as by a blow torch, and maintained. Upon removal of heat, the burning of the slurry ceases and flames die out.

The metal-hydride slurries provided herein can be capable of holding between about 3% and about 6% by weight of hydrogen. The slurry in some case can release from about 70% to about 98% of the uptaken hydrogen (e.g., from about 80 to 98% or from 90 to 98% of the uptaken hydrogen). The residual hydride that remains can then function as a catalyst for the recharging of the depleted metal-hydride slurry.

Generally, the discharge device is similar to the charging device. The discharge device generally includes a fluid-holding vessel and a heating device (e.g., heating coils, a heat exchanger, and/or a heating plug) for heating the slurry therein to the discharging temperature. Where magnesium hydride is utilized, the discharging temperature can be at least about 280° C. (e.g., at least about 300° C., at least about 320° C., at least 340° C., at least about 350° C., at least about 360° C., at least about 370° C., at least about 380° C., or at least about 390° C.) and/or at most about 400° C. (e.g., at most about 390° C., at most about 380° C., at most about 370° C., at most about 360° C., at most about 350° C., at most about 340° C., at most about 320° C., or at most about 300° C.). Other hydrides can operate with reduced temperatures and pressures. The device further includes a hydrogen gas outlet for releasing hydrogen gas from the vessel. The discharge device optionally further includes a heat removal apparatus (e.g., a heat pump, heat exchanger, or an insulated counter flow heat exchanger) for reducing the temperature of the slurry once it is depleted of releasable hydrogen.

In some examples, the discharge device operates on a batch-by-batch basis. Charged metal-hydride slurry is pumped into the device and heated, at which time hydrogen evolves from the slurry. The depleted slurry is then optionally cooled and pumped from the device (e.g., to a storage tank). The process is then repeated.

Figure 3:
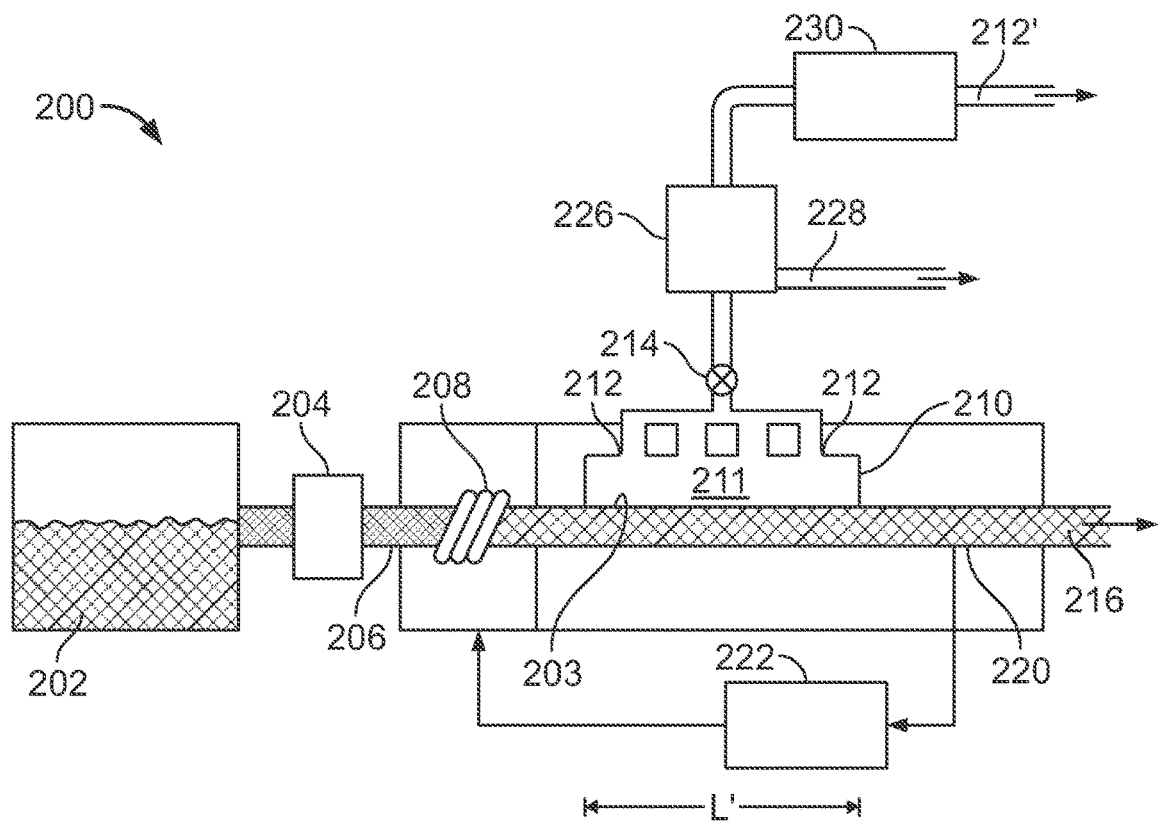
FIG. 3 is a schematic diagram of a metal hydride discharging device.

In some cases, charged metal-hydride slurry is continuously pumped into the discharge device, heated, depleted, cooled and removed. FIG. 3 illustrates an example of a continuous-mode discharge device 200, in which charged metal-hydride slurry 202 is fed by a pump 204 into a first section of tubing 206, where it is heated to the desorption temperature using heating coils 208. Once heated, the charged metal-hydride slurry 202 passes into a desorption chamber 210 having a headspace 211 above a surface 203 of the slurry 202. Hydrogen gas 212 desorbs from the charged metal-hydride slurry 202 into the headspace 211, from which it is vented via gas outlets 212. A pressure valve 214 can be used to control the pressure within headspace 211. The length of the desorption chamber 210 tubing is sufficient, when taken in combination with the flow rate of the slurry, to permit substantially all of the available hydrogen to desorb. The slurry, which is now a depleted metal-hydride slurry 216, exits the desorption chamber 210 and enters a third section of tubing 220, in which it is cooled to about room temperature, optionally by means of a heat exchanger 222 which takes the heat from the depleted metal-hydride slurry 216 and applies it to the charged metal-hydride slurry 202 entering the discharge device 200. The depleted metal-hydride slurry 216 is then pumped out of the discharge device 200, e.g., for storage and/or transport.

The pressure valve 214 can in some cases be coupled to a cooling system 226 to cool the hydrogen gas 212 and to condense any oils 228 which had volatilized and vented along with the hydrogen gas 212. The pressure valve can be located down stream of the oil condenser. The oil will condense at higher temperatures when under pressure. Any oil 228 so condensed could be added back into the depleted metal-hydride slurry 216. The hydrogen gas 212 can in some cases be run through a filter 230, e.g., a charcoal filter, to remove any remaining oils or other impurities. The now purified hydrogen gas 212' can then be fed to further processing, such as, for example, bottling. Alternatively, the hydrogen gas 212' can be supplied to a hydrogen-consuming process such as a fuel cell or a welding system.

Generally, a first energy source is used to form or extract the hydrogen that is stored in the hydride slurry. The first energy source is in certain examples an energy source that is readily available at a particular location (e.g., a first location) and/or is not readily available at, and/or not readily transferable to, a second location. Such energy sources include renewable energy sources such as, e.g., wind, geo-thermal, hydroelectric, ocean power (e.g., drawing on the energy of ocean waves, tides, or on the thermal energy stored in the ocean), biomass, and solar energy in the form of heat or electricity. Such energy sources generally do not produce greenhouse gases and are not subject to depletion. Biomass can produce greenhouse gases, but typically does not contribute substantial amounts of additional greenhouse gases to the atmosphere, since the biomass uses the greenhouse gases to make itself. In some embodiments, nuclear energy can be utilized to produce hydrogen. In other embodiments, fuels generally utilized as energy sources (e.g., coal, oil, and/or natural gas) can be utilized to produce hydrogen. The hydrogen can be produced at a small number of locations, where care can be taken to reduce pollution resulting from the burning of such fuels.

Many of these energy sources are not themselves easily transportable in an unused and/or stable form, in contrast to fossil fuels. In addition, many of these energy sources are in locations in which the energy demand is low (e.g., areas of low population density and/or little industrialization). In some locations, the available energy is greater than the energy demand. This excess energy can be stored and transported to locations of higher energy demand.

While embodiments described above refer generally to forming hydrogen at or near the site of metal hydride formation or charging, hydrogen can itself be stored and transported to metal hydride charging sites. For instance, hydrogen can be transported from large scale steam methane reformers to remote markets (e.g., markets several hundred miles away). Other embodiments are within the scope of the following claims.

What is claimed is:

1. A system for generating a metal hydride slurry, the system comprising:
a charging device comprising a slurry-holding vessel, a heating device for heating a metal slurry therein to a charging temperature, and a hydrogen gas inlet, and a slurry within the slurry-holding vessel, wherein the slurry comprises a metal or a metal alloy, a metal hydride, and a liquid carrier, wherein the metal or metal alloy is in the form of particles having a diameter of between 0.1 micron and 100 microns within the metal slurry, and wherein the metal comprises at least 50 weight percent magnesium and at least one element selected from the group consisting of vanadium, nickel, and iron.

2. The system of claim 1, further comprising a sprayer configured to spray particles of metal or a metal alloy into the slurry-holding vessel.

3. The system of claim 1, further comprising a pressure regulator.

4. The system of claim 1, further comprising a heat removal apparatus.

5. The system of claim 1, further comprising a stirring or mixing component.

6. The system of claim 1, wherein the slurry comprises at least 1.2 weight percent of metal hydride.

7. The system of claim 1, wherein the metal hydride comprises magnesium hydride.

8. The system of claim 1, wherein the liquid carrier comprises mineral oil.

9. The system of claim 1, wherein the slurry comprises magnesium, mineral oil, and a dispersant.

10. The system of claim 9, wherein the dispersant comprises a triglyceride, a polymeric dispersant, or a combination thereof.

11. The system of claim 1, wherein the metal or metal alloy former is in powder form, and wherein the powder further comprises mineral oil and a dispersant.

12. The system of claim 11, wherein the powder has been milled.

13. The system of claim 1, wherein the concentration of the metal in the slurry is in the range of 40 to 80 weight percent.

14. The system of claim 1, further comprising a metal hydride slurry storage device in fluid communication with the slurry-holding vessel.

15. The system of claim 14, further comprising a pump and a discharge device, wherein the pump is configured to transfer a metal hydride slurry from the storage device into the discharge device.

16. The system of claim 15, wherein the discharge device comprises a heating device.

17. the system of claim 16, wherein the discharge device further comprises a heat removal apparatus.

* * * * *